US010409352B2

(12) United States Patent
Chadha et al.

(10) Patent No.: US 10,409,352 B2
(45) Date of Patent: *Sep. 10, 2019

(54) BUDGETING FOR POWER CONSUMPTION IN A CHASSIS ENVIRONMENT THAT INCLUDES A PLURALITY OF INTEGRATED TECHNOLOGY ELEMENTS

(71) Applicant: International Business Machines Corporation, Armonk, NY (US)

(72) Inventors: Saurabh Chadha, Bangalore (IN); Prasanna Jayaraman, Austin, TX (US); Tony E. Sawan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 15/797,753

(22) Filed: Oct. 30, 2017

(65) Prior Publication Data

US 2018/0046237 A1    Feb. 15, 2018

Related U.S. Application Data

(63) Continuation of application No. 14/834,900, filed on Aug. 25, 2015, now Pat. No. 9,841,800, which is a (Continued)

(51) Int. Cl.
*G06F 1/26* (2006.01)
*G06F 1/28* (2006.01)
(Continued)

(52) U.S. Cl.
CPC ............... *G06F 1/28* (2013.01); *G06F 1/263* (2013.01); *G06F 1/3206* (2013.01);
(Continued)

(58) Field of Classification Search
CPC .................................................... G06F 1/3206
(Continued)

(56) References Cited

U.S. PATENT DOCUMENTS 8,381,000 B2* 2/2013 Brumley ............... G06F 1/3209
713/300
8,390,148 B2 3/2013 Shetty et al.
(Continued)

FOREIGN PATENT DOCUMENTS

CN       102722231 A    10/2012
JP    2004/078935 A     3/2004
(Continued)

OTHER PUBLICATIONS

Appendix P; List of IBM Patent or Applications Treated as Related, Oct. 30, 2017, 2 pages.
(Continued)

*Primary Examiner* — Volvick Derose
(74) *Attorney, Agent, or Firm* — Jason H. Sosa

(57) ABSTRACT

Methods, apparatuses, and products for budgeting for power consumption in a chassis environment that includes a plurality of integrated technology elements ('ITEs'), each ITE having power utilization information indicating an average power consumption of the ITE, including: determining, by a chassis management module, a total power requirement value based on a sum of the average power consumption for each ITE; increasing, by the chassis management module, the total power requirement value in dependence upon a predetermined power utilization delta; identifying, by the chassis management module, one or more power supplies to provide power to the ITEs in the chassis environment in dependence upon power delivery capabilities of the one or more power supplies and the total power requirement value;
(Continued)

and powering on the identified one or more power supplies by the chassis management module.

15 Claims, 5 Drawing Sheets

Related U.S. Application Data continuation of application No. 14/269,433, filed on May 5, 2014, now Pat. No. 9,454,200.

(51) Int. Cl.
*G06F 1/3206* (2019.01)
*G06F 1/3234* (2019.01)
*G06F 1/3203* (2019.01)
*G06F 1/3296* (2019.01)

(52) U.S. Cl.
CPC ............. *G06F 1/3234* (2013.01); *G06F 1/26* (2013.01); *G06F 1/3203* (2013.01); *G06F 1/3296* (2013.01)

(58) Field of Classification Search
USPC .................................................... 713/300
See application file for complete search history.

(56) References Cited

U.S. PATENT DOCUMENTS

| | | | | |
|---|---|---|---|---|
| 8,595,515 | B1* | 11/2013 | Weber ............... | G06F 1/3206 713/300 |
| 9,454,200 | B2 | 9/2016 | Chadha et al. | |
| 2002/0066045 | A1* | 5/2002 | Layton ............... | G06F 1/26 713/300 |
| 2003/0115000 | A1* | 6/2003 | Bodas ............... | G06F 1/26 702/60 |
| 2004/0003303 | A1* | 1/2004 | Oehler ............... | G06F 1/3203 713/300 |
| 2004/0030940 | A1 | 2/2004 | Espinoza-Ibarra et al. | |
| 2004/0030941 | A1* | 2/2004 | Barr ............... | G06F 1/3203 713/300 |
| 2006/0082222 | A1* | 4/2006 | Pincu ............... | H02J 1/102 307/29 |
| 2006/0206730 | A1* | 9/2006 | Cartes ............... | G06F 1/26 713/300 |
| 2007/0049133 | A1* | 3/2007 | Conroy ............... | G06F 1/26 439/894 |
| 2007/0260897 | A1* | 11/2007 | Cochran ............... | G06F 1/263 713/300 |
| 2008/0072090 | A1* | 3/2008 | O'Connor ............... | G06F 1/26 713/330 |
| 2008/0077817 | A1* | 3/2008 | Brundridge ............... | G06F 1/3203 713/340 |
| 2008/0178019 | A1 | 7/2008 | McGrane et al. | |
| 2008/0320322 | A1* | 12/2008 | Green ............... | G06F 1/26 713/340 |
| 2009/0031148 | A1* | 1/2009 | Densham ............... | G06F 1/189 713/300 |
| 2009/0319808 | A1* | 12/2009 | Brundridge ............... | G06F 1/189 713/300 |
| 2010/0244778 | A1* | 9/2010 | Chuang ............... | H02J 1/102 320/150 |
| 2010/0332873 | A1* | 12/2010 | Munjal ............... | G06F 1/3203 713/320 |
| 2011/0047390 | A1 | 2/2011 | Bolan et al. | |
| 2011/0289327 | A1 | 11/2011 | Nolterieke et al. | |
| 2011/0301889 | A1* | 12/2011 | Naffziger ............... | G06F 1/206 702/62 |
| 2011/0314309 | A1* | 12/2011 | Hansen ............... | G06F 1/26 713/300 |
| 2012/0072745 | A1* | 3/2012 | Ahluwalia ............... | G06F 1/26 713/320 |
| 2012/0086276 | A1* | 4/2012 | Sawyers ............... | H02J 1/12 307/66 |
| 2012/0137158 | A1* | 5/2012 | Nelluri ............... | G06F 1/3203 713/340 |
| 2012/0197451 | A1* | 8/2012 | Jang ............... | G06Q 10/063 700/291 |
| 2013/0226362 | A1* | 8/2013 | Jagadishprasad ..... | G06F 9/5094 700/297 |
| 2013/0261825 | A1* | 10/2013 | Han ............... | G06F 1/26 700/291 |
| 2013/0268779 | A1* | 10/2013 | Hueston ............... | G06F 1/3206 713/300 |
| 2014/0067139 | A1* | 3/2014 | Berke ............... | G06F 1/26 700/291 |
| 2014/0310537 | A1* | 10/2014 | Messick ............... | G06F 1/263 713/300 |
| 2014/0331069 | A1* | 11/2014 | Branover ............... | G06F 1/206 713/340 |
| 2014/0359331 | A1* | 12/2014 | Kuan ............... | G06F 1/263 713/323 |
| 2015/0316970 | A1 | 11/2015 | Chadha et al. | |
| 2015/0362971 | A1 | 12/2015 | Chadha et al. | |
| 2015/0370301 | A1* | 12/2015 | Bolan ............... | G06F 1/263 713/322 |
| 2016/0033098 | A1* | 2/2016 | Bergman ............... | H02G 3/20 362/418 |

FOREIGN PATENT DOCUMENTS

| | | |
|---|---|---|
| WO | WO-2002/023762 A1 | 3/2002 |
| WO | WO-2012/047713 A2 | 4/2012 |
| WO | WO-2012/175144 A1 | 12/2012 |

OTHER PUBLICATIONS

Ranganathan et al., *Ensemble-level Power Management for Dense Blade Servers*, In ACM SIGARCH Computer Architecture News, May 2006, vol. 34, No. 2, pp. 66-77, ACM New York, USA.

Mandagere et al., *Data Center Power Management*, ACM Transactions on Computational Logic (TOCL), Sep. 2009, vol. V, No. N, pp. 1-25, ACM New York, USA.

Pahlavan et al., *Data Center Power Reduction by Heuristic Variation-Aware Server Placement and Chassis Consolidation*, In 16th CSI International Symposium on Computer Architecture and Digital Systems (CADS), May 2012, pp. 150-155, IEEE Xplore Digital Library, DOI: 10.1109/CADS.2012.6316436.

Arredondo et al., *Implementing PWM Fan Speed Control Within a Computer Chassis Power Supply*, In Twentieth Annual IEEE Applied Power Electronics Conference and Exposition (APEC 2005), Mar. 2005, vol. 1, pp. 148-151, IEEE Xplore Digital Library, DOI: 10.1109/APEC.2005.1452905.

Cisco, *Power Management for Catalyst 6000 Series Switches*, Cisco Catalyst 6500 Series Switches, cisco.com (online publication), Aug. 2008, 7 pages, URL: http://www.cisco.com/en/US/products/hw/switches/ps708/products_tech_note09186a008015bfa8.shtml.

* cited by examiner

BUDGETING FOR POWER CONSUMPTION IN A CHASSIS ENVIRONMENT THAT INCLUDES A PLURALITY OF INTEGRATED TECHNOLOGY ELEMENTS

CROSS-REFERENCE TO RELATED APPLICATIONS

This application is a continuation application of U.S. patent application Ser. No. 14/834,900, filed Aug. 25, 2015, which claims priority to U.S. Pat. No. 9,454,200, issued Sep. 27, 2016.

BACKGROUND OF THE INVENTION

Field of the Invention

The field of the invention is data processing, or, more specifically, methods, apparatus, and products for budgeting for power consumption in a chassis environment that includes a plurality of integrated technology elements ('ITEs').

Description of Related Art

Modern computing systems can include a plurality of blade servers and other computing devices mounted within a blade center. Such a blade center may include a management module that is responsible for carrying out various administrative tasks. One example of an administrative task performed by the management module is managing the distribution of power to power consuming components within the blade center. Each power consuming component within the blade center may be characterized by a maximum power utilization value representing the maximum amount of power that the power consuming component can utilize, typically when the power consuming component is operating at full capacity. In order to manage the distribution of power to the power consuming components within the blade center, the management module may allocate enough power producing resources, such as power supplies, to provide for sufficient power to the power consuming components in the event that each power consuming component is consuming power at a rate that is equal to its maximum power utilization value. Because each power consuming component is not always consuming power at a rate that is equal to its maximum power utilization value, this power management approach can result in an over-allocation of power producing resources that does not take into account the actual power consumption of the power consuming resources.

SUMMARY OF THE INVENTION

Methods, apparatuses, and products for budgeting for power consumption in a chassis environment that includes a plurality of ITEs, each ITE having power utilization information indicating an average power consumption of the ITE, including: determining, by a chassis management module, a total power requirement value based on a sum of the average power consumption for each ITE; increasing, by the chassis management module, the total power requirement value in dependence upon a predetermined power utilization delta; identifying, by the chassis management module, one or more power supplies to provide power to the ITEs in the chassis environment in dependence upon power delivery capabilities of the one or more power supplies and the total power requirement value; and powering on the identified one or more power supplies by the chassis management module.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
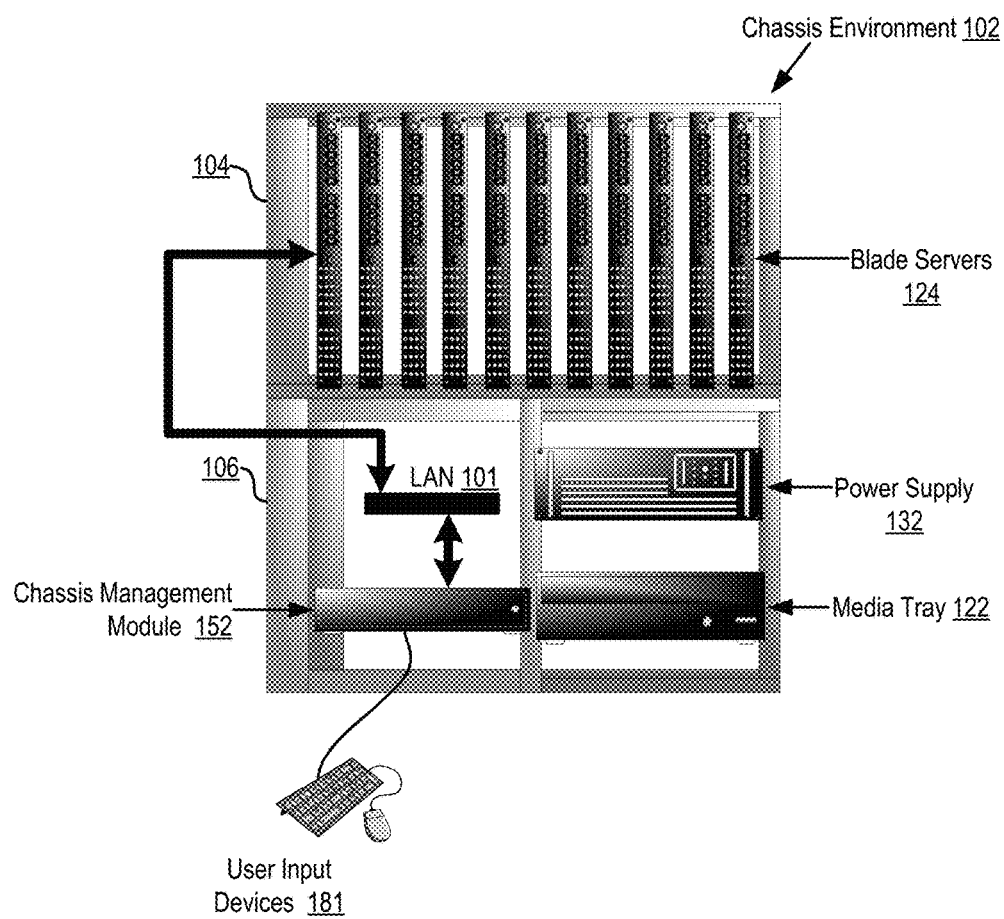
FIG. 1 sets forth a diagram of an example data processing system capable of budgeting for power consumption in a chassis environment that includes a plurality of ITEs according to embodiments of the present invention.

Example methods, apparatuses, and products for budgeting for power consumption in a chassis environment that includes a plurality of ITEs in accordance with the present invention are described with reference to the accompanying drawings, beginning with FIG. 1. FIG. 1 sets forth a diagram of an example data processing system capable of budgeting for power consumption in a chassis environment that includes a plurality of ITEs according to embodiments of the present invention. Each ITE represents a computing component such as a blade server, storage device, blower, or other power consuming computing component.

The data processing system of FIG. 1 includes a chassis environment (102). A 'chassis environment,' as the term is used in this specification, refers generally to a blade server system. The blade server system in the example depicted in FIG. 1 is installed in a two-bay chassis (104, 106) and including one or more of blade servers (124), one or more chassis management modules (152), one or more media trays (122), and one or more blade server system power supplies (132). The chassis environment (102) of FIG. 1 therefore includes a plurality of ITEs, illustrated in this example as blade servers (124), the chassis management module (152), and the media tray (122), although readers will appreciate that in other embodiments the ITEs may include any power consuming computing component of the chassis environment (102).

The chassis management module (152) of FIG. 1 may be embodied as a computer, including software and hardware components, one or more computer processors and computer memory, that provides system management functions for components in the example chassis environment (102), including the blade servers (124) and the media tray (122). The chassis management module (152) of FIG. 1 may also make available connections for user input devices such as mice or keyboards (181) that are not generally connected directly to the blade servers (124) or to the chassis itself.

The chassis environment (102) of FIG. 1 also includes one or more blade servers (124). The one or more blade servers (124) of FIG. 1 are installed in cabinet bay (104) of the example chassis environment (102). Such blade servers (124) are computing devices implemented in blade form factor. The blade servers (124) may share access to the media tray (122) and may be connected to one another and to the chassis management module (152) for data communications through a local area network ('LAN') (101), which may be embodied as a small network installed within the chassis environment.

The chassis environment (102) of FIG. 1 also includes one or more media trays (122). The one or more media trays (122) in FIG. 1 may house non-volatile memory media generally. A media tray (122) may typically include Compact Disc read-only media drives ('CD-ROM'), Digital Video Disc ROM drives (DVD-ROM), CD-RW drives, DVD-RW drives, floppy disk drives, and so on as will occur those of skill in the art.

The arrangement of the chassis environment (102), network (101), and other devices making up the example system illustrated in FIG. 1 are for explanation, not for limitation. Data processing systems useful according to various embodiments of the present invention may include additional servers, routers, and other devices, not shown in FIG. 1, as will occur to those of skill in the art. Networks in such data processing systems may support many data communications protocols, including Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Figure 2:
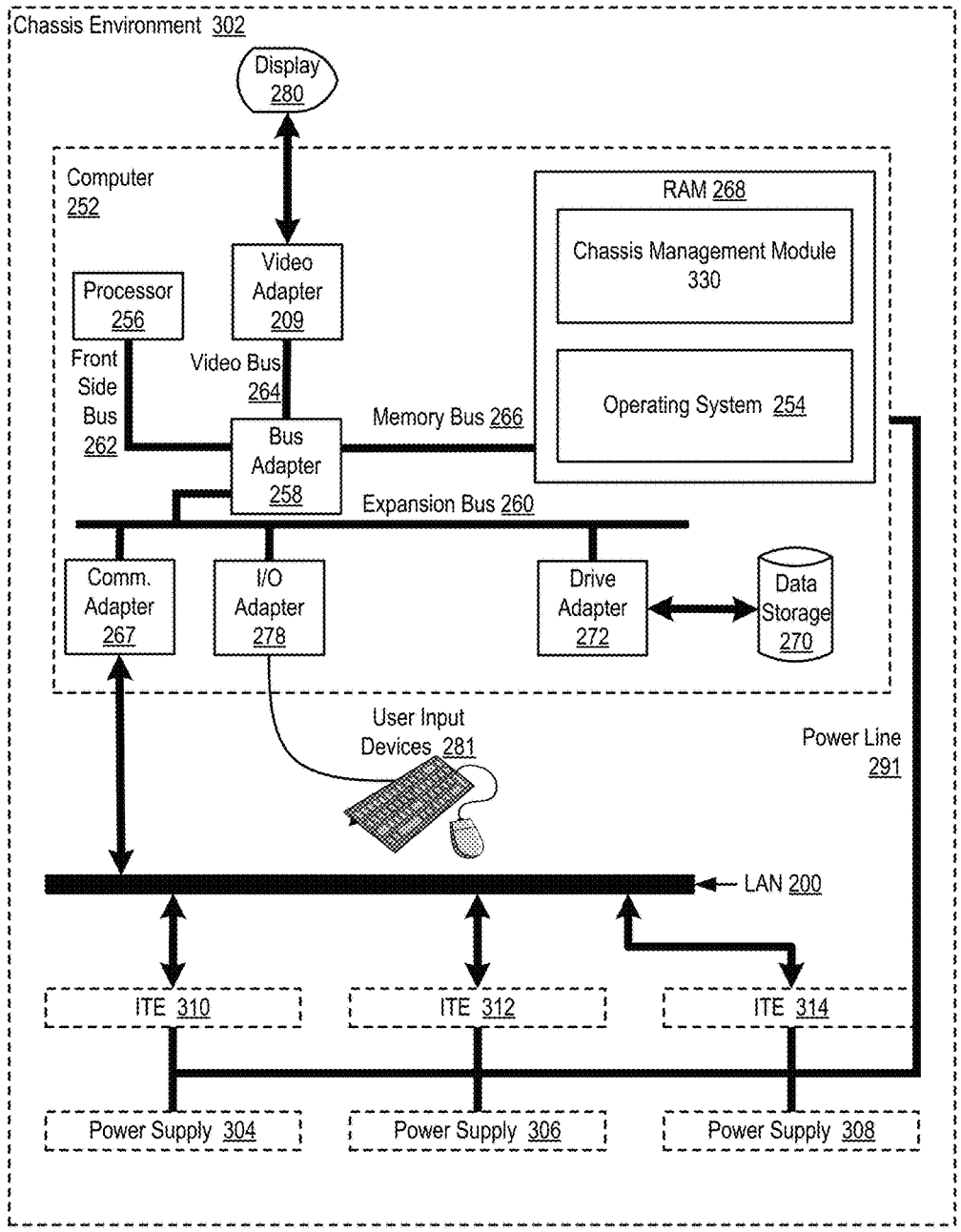
FIG. 2 sets forth a block diagram of automated computing machinery comprising an example computer useful in budgeting for power consumption in a chassis environment that includes a plurality of ITEs according to embodiments of the present invention.

For further explanation, FIG. 2 sets forth a block diagram of automated computing machinery comprising an example computer (252) useful in budgeting for power consumption in a chassis environment (302) that includes a plurality of ITEs (310, 312, 314) according to embodiments of the present invention. The chassis environment (302) of FIG. 2 may be embodied, for example, as a blade server system that includes a plurality of blade servers, one or more media trays, one or more power supplies (304, 306, 308), and so on. In such an example, each ITE (310, 312, 314) may be embodied, for example, as a blade server, blower, network switch, storage device, or other power consuming component mounted within the chassis environment (302).

The computer (252) of FIG. 2 includes at least one computer processor (256) or 'CPU' as well as random access memory ('RAM') (268) which is connected through a high speed memory bus (266) and bus adapter (258) to processor (256) and to other components of the computer (252). Stored in RAM (268) is a chassis management module (330), a module of computer program instructions for budgeting for power consumption in a chassis environment (302) that includes a plurality of ITEs (310, 312, 314) according to embodiments of the present invention.

The chassis management module (330) may be configured to budget for power consumption in a chassis environment (302) that includes a plurality of ITEs (310, 312, 314) by determining a total power requirement value based on the sum of the average power consumption for each ITE (310, 312, 314). The total power requirement value represents the total amount of power being used by all of the ITEs (310, 312, 314) in the chassis environment (302), based on the average power consumption of each ITE (310, 312, 314) in the chassis environment (302). Determining the total power requirement value may be carried out by the chassis management module (330) receiving, from each ITE (310, 312, 314), the average power consumption for each ITE (310, 312, 314) in the chassis environment (302). In such an example, determining the total power requirement value may subsequently include summing the average power consumption for each ITE (310, 312, 314) in the chassis environment (302).

The chassis management module (330) may be further configured to budget for power consumption in a chassis environment (302) that includes a plurality of ITEs (310, 312, 314) by increasing the total power requirement value in dependence upon a predetermined power utilization delta. The predetermined power utilization delta represents an amount of additional power that can be allocated for use by the ITEs (310, 312, 314), such that an increase in the actual amount of power consumed by the ITEs (310, 312, 314) does not cause the actual amount of power consumed by the ITEs (310, 312, 314) to exceed the amount of power allocated for use by the ITEs (310, 312, 314).

Consider an example in which a first ITE (310) has an average power consumption of 600 Watts, a second ITE (312) has an average power consumption of 500 Watts, and a third ITE (314) has an average power consumption of 800 Watts. In such an example, the total power requirement value may be determined to be 1900 Watts. In the event that one or more of the ITEs (310, 312, 314) begins consuming additional power, however, the ITEs (310, 312, 314) will require more than 1900 Watts of total power to continue normal operations. In order to ensure that an increased demand for power can be met, the chassis management module (330) may allocate additional power resources so as to provide for more than the 1900 Watts of power presently needed. This additional allocation of power can be specified by the system power utilization delta, whose value may be determined based on many factors such as the time required to turn on an additional power supply, the number of ITEs (310, 312, 314) currently drawing power, and so on.

The chassis management module (330) may be further configured to budget for power consumption in a chassis environment (302) that includes a plurality of ITEs (310, 312, 314) by identifying one or more power supplies (304, 306, 308) to provide power to the ITEs (310, 312, 314) in the chassis environment (302). The chassis management module (330) may identify one or more power supplies (304, 306, 308) to provide power to the ITEs (310, 312, 314) in dependence upon power delivery capabilities of the one or more power supplies (304, 306, 308) and the total power requirement value. The power delivery capabilities of the one or more power supplies (304, 306, 308) may include, for example, the total amount of power that each of the power supplies (304, 306, 308) can deliver to one or more ITEs (310, 312, 314).

Consider the example described above in which the first ITE (310) has an average power consumption of 600 Watts, a second ITE (312) has an average power consumption of 500 Watts, and a third ITE (314) has an average power consumption of 800 Watts, such that the total power requirement value may be determined to be 1900 Watts. Assume in such an example that the system power utilization delta is set to a value of 300 Watts, such that the total power requirement value is increased to a value of 2200 Watts. Further assume that the power delivery capabilities of the one or more power supplies (304, 306, 308) are such that each of the power supplies in capable of delivering 1200 Watts of power. In such an example, identifying one or more power supplies (304, 306, 308) to provide power to the ITEs (310, 312, 314) in dependence upon power delivery capabilities of the one or more power supplies (304, 306, 308) and the total power requirement value may therefore include selecting any two of the three available power supplies (304, 306, 308) to provide power to the ITEs (310, 312, 314), as any combination of the two power supplies (304, 306, 308) can deliver the 2200 Watts representing the total power requirement value. In an alternative embodiment where two power supplies (304, 306) are each capable of delivering 1200 Watts of power while the third power supply (308) is only capable of delivering 800 Watts of power, the two power supplies (304, 306) that are each capable of delivering 1200 Watts of power may be identified as the one or more power supplies (304, 306) to provide power to the ITEs (310, 312, 314) in the chassis environment (302).

The chassis management module (330) may be further configured to budget for power consumption in a chassis environment (302) that includes a plurality of ITEs (310, 312, 314) by powering on the identified one or more power supplies (304, 306, 308). Powering on the identified one or more power supplies (304, 306, 308) may be carried out, for example, by the chassis management module (330) sending a control signal over a control line such as a power management bus between each of the power supplies (304, 306, 308) and the chassis management module (330). In such a way, the chassis management module (330) may be configured to send an 'On' signal or an 'Off' signal to each of the power supplies (304, 306, 308) such that power is delivered to one or more of the ITEs (310, 312, 314) from the one or more power supplies (304, 306, 308) over a power line (291).

Also stored in RAM (268) of the computer (252) is an operating system (254). Operating systems useful budgeting for power consumption in a chassis environment (302) that includes a plurality of ITEs (310, 312, 314) according to embodiments of the present invention include UNIX™, Linux™, Microsoft XP™, AIX™, IBM's i5/OS™, and others as will occur to those of skill in the art. The operating system (254) and the chassis management module (330) in the example of FIG. 2 are shown in RAM (268), but many components of such software typically are stored in non-volatile memory also, such as, for example, on a disk drive (270).

The computer (252) of FIG. 2 includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers for budgeting for power consumption in a chassis environment (302) that includes a plurality of ITEs (310, 312, 314) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example computer (252) of FIG. 2 includes a video adapter (209), which is an example of an I/O adapter specially designed for graphic output to a display device (280) such as a display screen or computer monitor. Video adapter (209) is connected to processor (256) through a high speed video bus (264), bus adapter (258), and the front side bus (262), which is also a high speed bus.

The example computer (252) of FIG. 2 includes a communications adapter (267) for data communications with other computers such as the ITEs (310, 312, 314) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for budgeting for power consumption in a chassis environment (302) that includes a plurality of ITEs (310, 312, 314) according to embodiments of the present invention include modems for wired dial-up communications, Ethernet (IEEE 802.3) adapters for wired data communications network communications, and 802.11 adapters for wireless data communications network communications.

Figure 3:
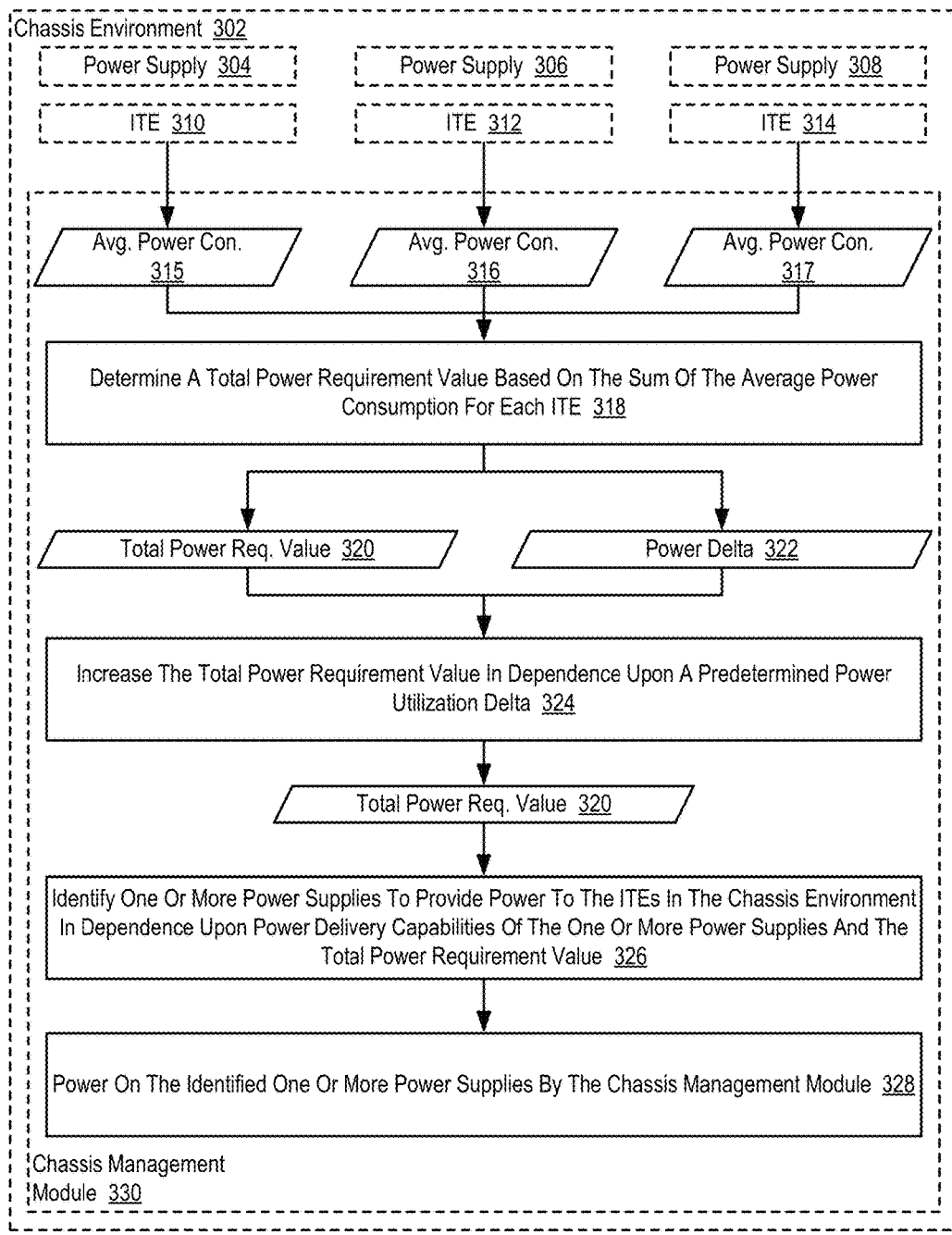
FIG. 3 sets forth a flow chart illustrating an example method for budgeting for power consumption in a chassis environment that includes a plurality of ITEs according to embodiments of the present invention.

For further explanation, FIG. 3 sets forth a flow chart illustrating an example method for budgeting for power consumption in a chassis environment (302) that includes a plurality of ITEs (310, 312, 314) according to embodiments of the present invention. The chassis environment (302) of FIG. 3 may be embodied, for example, as a blade server system that includes a plurality of blade servers, one or more media trays, one or more power supplies (304, 306, 308), and so on. In such an example, each ITE (310, 312, 314) may be embodied, for example, as a blade server, blower, network switch, storage device, or other power consuming component mounted within the chassis environment (302).

The chassis environment (302) depicted in FIG. 3 includes a chassis management module (330). The chassis management module (330) may be embodied, for example, as a module of computer program instructions executing on computer hardware such as a computer processor. For example, the chassis management module (330) may be embodied as a computer, including software and hardware components, one or more computer processors, and computer memory, that provides system management functions for all components in the example chassis environment (302). The chassis management module (330) may also make available connections for user input devices such as mice or keyboards that are not generally connected directly to the ITEs (310, 312, 314) or to the chassis environment (302).

The chassis environment (302) of FIG. 3 includes a plurality of ITEs (310, 312, 314). In the example method depicted in FIG. 3, each ITE (310, 312, 314) has power utilization information indicating an average power consumption (315, 316, 317) of the ITE (310, 312, 314). The average power consumption (315, 316, 317) of the ITE (310, 312, 314) may be measured, for example, over a predetermined period of time. In such an example, the period of time may be short enough and recent enough such that the average power consumption (315, 316, 317) is representative of the current power usage of a particular ITE (310, 312, 314). The average power consumption (315, 316, 317) of a particular ITE (310, 312, 314) may be expressed in absolute terms such as the number of Watts consumed by a particular ITE (310, 312, 314), or in relative terms such as the percentage of the maximum power consumption associated with a particular ITE (310, 312, 314). In the example depicted in FIG. 3, each ITE (310, 312, 314) may send a message containing its average power consumption (315, 316, 317) to the chassis management module (330), the chassis management module (330) may periodically poll each ITE (310, 312, 314) for its average power consumption (315, 316, 317), and so on.

The example method depicted in FIG. 3 includes determining (318), by the chassis management module (330), a total power requirement value (320) based on the sum of the average power consumption (315, 316, 317) for each ITE (310, 312, 314). The total power requirement value (320) represents the total amount of power being used by all of the ITEs (310, 312, 314) in the chassis environment (302), based on the average power consumption of each ITE (310, 312, 314) in the chassis environment (302). Determining (318) the total power requirement value (320) may be carried out by the chassis management module (330) summing the average power consumption (315, 316, 317) for each ITE (310, 312, 314) in the chassis environment (302).

The example method depicted in FIG. 3 also includes increasing (324), by the chassis management module (330), the total power requirement value (320) in dependence upon a predetermined power utilization delta (322). The predetermined power utilization delta (322) represents an amount of additional power that can be allocated for use by the ITEs (310, 312, 314), such that an increase in the actual amount of power consumed by the ITEs (310, 312, 314) does not cause the actual amount of power consumed by the ITEs (310, 312, 314) to exceed the amount of power allocated for use by the ITEs (310, 312, 314).

Consider an example in which a first ITE (310) has an average power consumption (315) of 600 Watts, a second ITE (312) has an average power consumption (316) of 500 Watts, and a third ITE (314) has an average power consumption (317) of 800 Watts. In such an example, the total power requirement value (320) may be determined (318) to be 1900 Watts. In the event that one or more of the ITEs (310, 312, 314) begins consuming additional power, however, the ITEs (310, 312, 314) will require more than 1900 Watts of total power to continue normal operations. In order to ensure that an increased demand for power can be met, the chassis management module (330) may allocate additional power resources so as to provide for more than the 1900 Watts of power presently needed. This additional allocation of power can be specified by the system power utilization delta (322), whose value may be determined based on many factors such as the time required to turn on an additional power supply, the number of ITEs (310, 312, 314) currently drawing power, and so on.

Consider an example in which additional power supplies can be turned on in 1 minute in a first system, while turning on additional power supplies in a second system only takes 1 second. In such an example, the system power utilization delta (322) of the second system may be set to a value that is lower than the system power utilization delta (322) of the first system, as an increase in the amount of power needed can be met more quickly in the second system relative to the first system. Stated differently, the system power utilization delta (322) may be set to a high value in the first system so as to satisfy a greater fluctuation in the amount of power available to the ITEs in the first system without needing to turn on an additional power supply.

The example method depicted in FIG. 3 also includes identifying (326), by the chassis management module (330), one or more power supplies (304, 306, 308) to provide power to the ITEs (310, 312, 314) in the chassis environment (302). In the example method depicted in FIG. 3, the chassis management module (330) may identify (326) one or more power supplies (304, 306, 308) to provide power to the ITEs (310, 312, 314) in dependence upon power delivery capabilities of the one or more power supplies (304, 306, 308) and the total power requirement value (320). The power delivery capabilities of the one or more power supplies (304, 306, 308) may include, for example, the total amount of power that each of the power supplies (304, 306, 308) can deliver to one or more ITEs (310, 312, 314).

Consider the example described above in which the first ITE (310) has an average power consumption (315) of 600 Watts, a second ITE (312) has an average power consumption (316) of 500 Watts, and a third ITE (314) has an average power consumption (317) of 800 Watts, such that the total power requirement value (320) may be determined (318) to be 1900 Watts. Assume in such an example that the system power utilization delta (322) is set to a value of 300 Watts, such that the total power requirement value (320) is increased (324) to a value of 2200 Watts. Further assume that the power delivery capabilities of the one or more power supplies (304, 306, 308) are such that each of the power supplies in capable of delivering 1200 Watts of power. In such an example, identifying (326) one or more power supplies (304, 306, 308) to provide power to the ITEs (310, 312, 314) in dependence upon power delivery capabilities of the one or more power supplies (304, 306, 308) and the total power requirement value (320) may therefore include selecting any two of the three available power supplies (304, 306, 308) to provide power to the ITEs (310, 312, 314), as any combination of the two power supplies (304, 306, 308) can deliver the 2200 Watts representing the total power requirement value (320). In an alternative embodiment where two power supplies (304, 306) are each capable of delivering 1200 Watts of power while the third power supply (308) is only capable of delivering 800 Watts of power, the two power supplies (304, 306) that are each capable of delivering 1200 Watts of power may be identified (326) as the one or more power supplies (304, 306) to provide power to the ITEs (310, 312, 314) in the chassis environment (302).

The example method depicted in FIG. 3 also includes powering (328) on the identified one or more power supplies (304, 306, 308) by the chassis management module (330). Powering (328) on the identified one or more power supplies (304, 306, 308) may be carried out, for example, by the chassis management module (330) sending a control signal over a control line such as a power management bus between each of the power supplies (304, 306, 308) and the chassis management module (330). In such a way, the chassis management module (330) may be configured to send an 'On' signal or an 'Off' signal to each of the power supplies (304, 306, 308).

Figure 4:
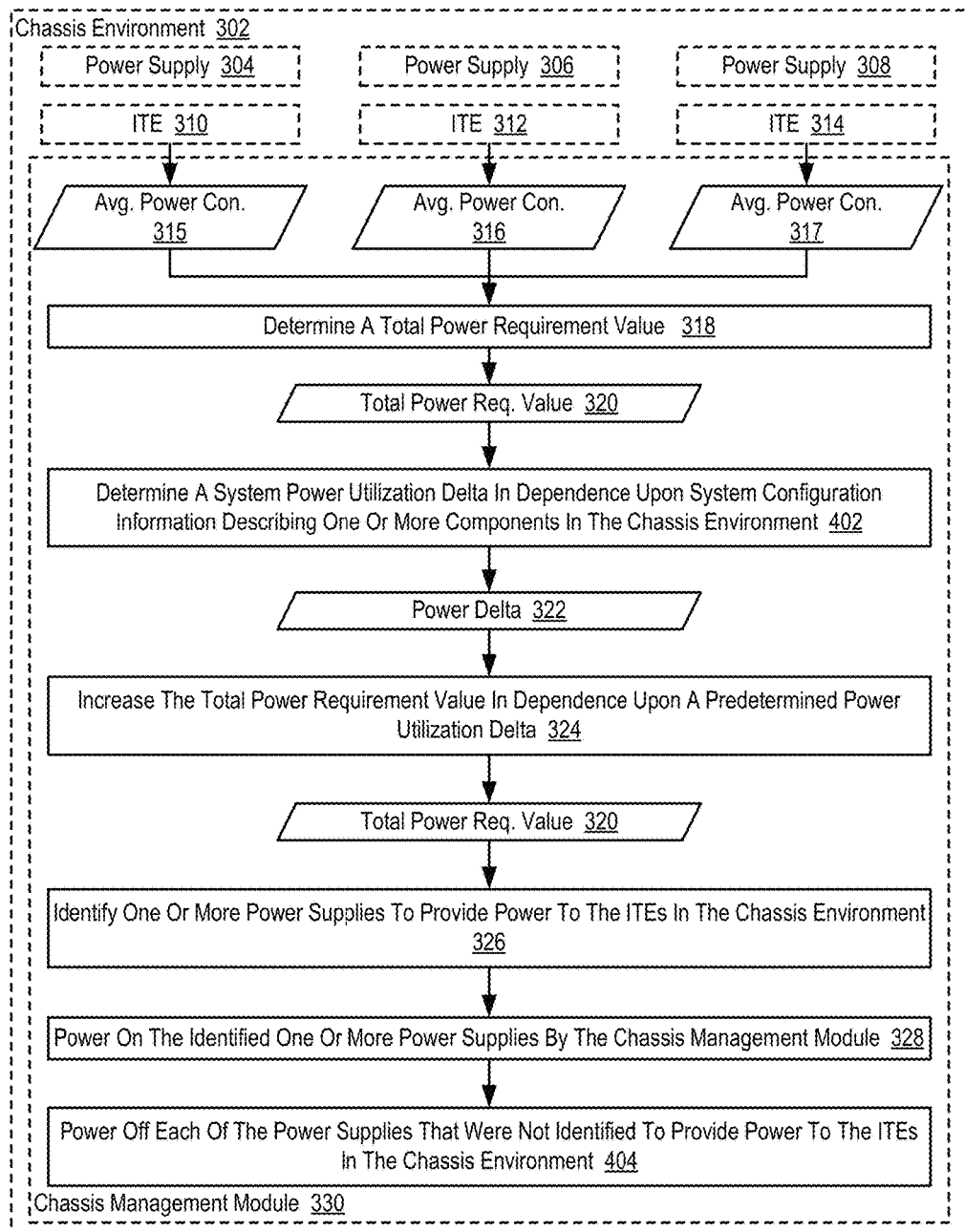
FIG. 4 sets forth a flow chart illustrating an additional example method for budgeting for power consumption in a chassis environment that includes a plurality of ITEs according to embodiments of the present invention.

For further explanation, FIG. 4 sets forth a flow chart illustrating an additional example method for budgeting for power consumption in a chassis environment that includes a plurality of ITEs (310, 312, 314) according to embodiments of the present invention. The example method depicted in FIG. 4 is similar to the example method depicted in FIG. 3, as it also includes determining (318) a total power requirement value (320) based on the sum of the average power consumption (315, 316, 317) for each ITE (310, 312, 314), increasing (324) the total power requirement value (320) in dependence upon a predetermined power utilization delta (322), identifying (326) one or more power supplies (304, 306, 308) to provide power to the ITEs (310, 312, 314) in the chassis environment (302) in dependence upon power delivery capabilities of the one or more power supplies (304, 306, 308) and the total power requirement value (320), and powering (328) on the identified one or more power supplies (304, 306, 308) by the chassis management module (330).

The example method depicted in FIG. 4 also includes determining (402), by the chassis management module (330), a system power utilization delta (322) in dependence upon system configuration information describing one or more components in the chassis environment (302). The system configuration information describing one or more components in the chassis environment (302) can include, for example, the number of ITEs (310, 312, 314) in the chassis environment (302), the maximum possible power that can be consumed by each of the ITEs (310, 312, 314) in the chassis environment (302), the amount of time required to power on an additional power supply (304, 306, 308), or any other information useful in determining how much additional power to allocate for use by the ITEs (310, 312, 314) beyond the sum of the average power consumption (315, 316, 317) for the ITEs (310, 312, 314).

Consider an example in which a first system includes only one active ITE, which is consuming an average of 300 Watts of power and is only capable of consuming 400 Watts of power when the one active ITE is fully utilized. In such an example, a system power utilization delta (322) would need to be no more than 100 Watts as the power consumption of the one active ITE could only possibly increase by 100 Watts. Alternatively, in a second system that includes one thousand active ITEs, which are cumulatively consuming an average of 300 kiloWatts and are cumulatively capable of consuming up to 400 kiloWatts when each of the one thousand active ITEs are fully utilized, a system power utilization delta (322) of 100 Watts may be insufficient as the cumulative actual power consumption of the one thousand active ITEs could easily increase more than 100 Watts.

In the example method depicted in FIG. 4, determining (402) a system power utilization delta (322) in dependence upon system configuration information describing one or more components in the chassis environment (302) may be carried out through the use of a predetermined formula that takes into account many system configuration factors. Such a formula may, for example, increase the system power utilization delta (322) as the number of ITEs in the chassis environment (302) increases, decrease the system power utilization delta (322) as the number of ITEs in the chassis environment (302) decreases, increase or decrease the system power utilization delta (322) in dependence upon how slowly or quickly one or more power supplies in the chassis environment (302) can be powered on, decrease the system power utilization delta (322) as the cumulative amount of power consumed by each ITE in the chassis environment (302) approaches the cumulative maximum of power that can possibly be consumed by each ITE in the chassis environment (302), increase the system power utilization delta (322) as the cumulative amount of power consumed by each ITE in the chassis environment (302) gets further below the cumulative maximum of power that can possibly be consumed by each ITE in the chassis environment (302), and so on. In such a way, the system power utilization delta (322) may change over time as characteristics of the chassis environment (302) change and as the power consumption of the ITEs with the chassis environment (302) change.

The example method depicted in FIG. 4 also includes powering (404) off each of the power supplies (304, 306, 308) that were not identified (326) to provide power to the ITEs (310, 312, 314) in the chassis environment (302). Powering (404) off the identified one or more power supplies (304, 306, 308) may be carried out, for example, by the chassis management module (330) sending a control signal over a control line such as a power management bus between each of the power supplies (304, 306, 308) and the chassis management module (330). In such a way, the chassis management module (330) may be configured to send an 'On' signal or an 'Off' signal to each of the power supplies (304, 306, 308).

Figure 5:
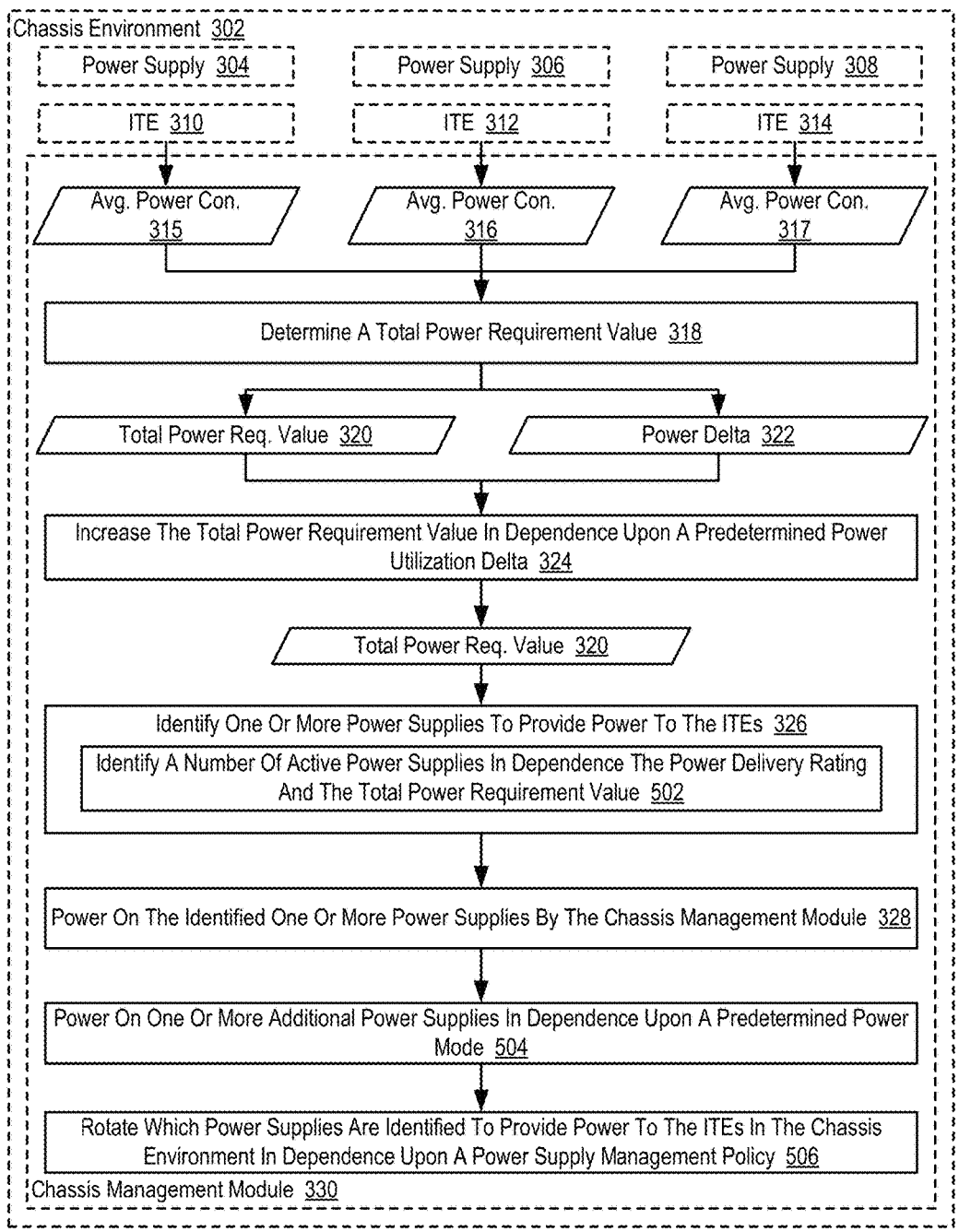
FIG. 5 sets forth a flow chart illustrating an additional example method for budgeting for power consumption in a chassis environment that includes a plurality of ITEs according to embodiments of the present invention.

For further explanation, FIG. 5 sets forth a flow chart illustrating an additional example method for budgeting for power consumption in a chassis environment that includes a plurality of ITEs (310, 312, 314) according to embodiments of the present invention. The example method depicted in FIG. 5 is similar to the example method depicted in FIG. 3, as it also includes determining (318) a total power requirement value (320) based on the sum of the average power consumption (315, 316, 317) for each ITE (310, 312, 314), increasing (324) the total power requirement value (320) in dependence upon a predetermined power utilization delta (322), identifying (326) one or more power supplies (304, 306, 308) to provide power to the ITEs (310, 312, 314) in the chassis environment (302) in dependence upon power delivery capabilities of the one or more power supplies (304, 306, 308) and the total power requirement value (320), and powering (328) on the identified one or more power supplies (304, 306, 308) by the chassis management module (330).

In the example method depicted in FIG. 5, each of the power supplies (304, 306, 308) can have an identical power delivery rating. In the example method depicted in FIG. 5, the power delivery rating represents the amount of power that a particular power supply (304, 306, 308) can deliver to one or more of the ITEs (310, 312, 314). In such an example, identifying (326) one or more power supplies (304, 306, 308) to provide power to the ITEs (310, 312, 314) can therefore include identifying (502) a number of active power supplies needed to provide power to the ITEs (310, 312, 314). Identifying (502) a number of active power supplies needed to provide power to the ITEs (310, 312, 314) may be carried out, for example, by dividing the total power requirement value (320) by the power delivery rating of each power supply (304, 306, 308) and rounding up to a whole number.

Consider an example in which the total power requirement value (320) is 2200 Watts and each power supply (304, 306, 308) has a power delivery rating indicating that each power supply (304, 306, 308) can deliver 1200 Watts to the ITEs (310, 312, 314). In such an example, the number of active power supplies needed to provide power to the ITEs (310, 312, 314) is equal to the rounded up value of 2200 Watts divided by 1200 Watts, indicating that the number of active power supplies needed to provide power to the ITEs (310, 312, 314) is two power supplies.

The example method depicted in FIG. 5 also includes powering (504) on one or more additional power supplies (304, 306, 308) in dependence upon a predetermined power mode. In the example method depicted in FIG. 5, the predetermined power mode is a predetermined policy that identifies the number of power supplies (304, 306, 308) to be powered on in excess of the actual number of power supplies (304, 306, 308) needed to an amount of power to the ITEs (310, 312, 314) that meets the total power requirement value (320). Such a predetermined power mode may be embodied, for example, as an 'N+1' power mode where one power supply in excess of the actual number of power supplies (304, 306, 308) needed to provide an amount of power to the ITEs (310, 312, 314) that meets the total power requirement value (320) is powered on. Alternatively, the predetermined power mode may be embodied as a 'N+N' power mode where twice the number of power supplies (304, 306, 308) that are needed to provide an amount of power to the ITEs (310, 312, 314) that meets the total power requirement value (320) are powered on. In such an example, the predetermined power mode may be set by a system administrator or other administrative entity.

The example method depicted in FIG. 5 also includes rotating (506), by the chassis management module (302), which power supplies (304, 306, 308) are identified (326) to provide power to the ITEs (310, 312, 314) in the chassis environment (302) in dependence upon a power supply management policy. In the example method depicted in FIG. 5, a power supply management policy represents a rule set for selecting which power supplies (304, 306, 308) are to be utilized for providing power to the ITEs (310, 312, 314) in the chassis environment (302). The power supply management policy may be designed such that different power supplies (304, 306, 308) are routinely utilized in order to maintain the operational health of the one or more power supplies (304, 306, 308) and to routinely check the operational health of the one or more power supplies (304, 306, 308). The power supply management policy may specify, for example, the maximum length of time that a particular power supply (304, 306, 308) may be active, the maximum length of time that a particular power supply (304, 306, 308) may be inactive, an algorithm that defines the order in which the power supplies are to be utilized, and so on.

Consider an example in which the total power requirement value (320) is 2200 Watts and each power supply (304, 306, 308) has a power delivery rating indicating that each power supply (304, 306, 308) can deliver 1200 Watts of power to the ITEs (310, 312, 314), such that two power supplies are sufficient for providing power to the ITEs (310, 312, 314). In such an example, if the same two power supplies (304, 306) always remain active while the remaining power supply (308) always remains inactive, the two active power supplies (304, 306) may wear out prematurely while the inactive power supply (308) may become stale and require an increased amount of time to power up. As such, a power supply management policy that limits the amount of time that a particular power supply (304, 306, 308) can remain active or inactive can result in each of the power supplies (304, 306, 308) being powered on for similar amounts of time, preventing premature wear on any of the power supplies (304, 306, 308). Readers will appreciate that in order to maintain and monitor the health of each power supply (304, 306, 308), the power supply management policy may specify an algorithm (e.g., round robin, least recently used, most recently used) to be used when determining an order in which power supplies are to be powered off and which power supplies are to be powered on as part of rotating (506) which power supplies (304, 306, 308) are identified (326) to provide power to the ITEs (310, 312, 314) in the chassis environment (302).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of budgeting for power consumption in a chassis environment that includes a plurality of integrated technology elements ('ITEs'), each ITE having power utilization information indicating an average power consumption of the ITE, the method comprising:

determining, by a chassis management module, a total power requirement value based on a sum of the average power consumption for each ITE;

determining, by the chassis management module, a system power utilization delta in dependence upon system configuration information describing one or more components in the chassis environment including an amount of time required to power on an additional power supply, wherein the system power utilization delta represents an amount of additional power that can be allocated for use by the ITEs;

increasing, by the chassis management module, the total power requirement value in dependence upon the system power utilization delta;

identifying, by the chassis management module, one or more power supplies to provide power to the ITEs in the chassis environment in dependence upon power delivery capabilities of the one or more power supplies and the increased total power requirement value.

2. The method of claim 1 further comprising powering off each of the power supplies that were not identified to provide power to the ITEs in the chassis environment.

3. The method of claim 1 further comprising rotating, by the chassis management module, which power supplies are identified to provide power to the ITEs in the chassis environment in dependence upon a power supply management policy.

4. The method of claim 1 wherein each of the power supplies has an identical power delivery rating and identifying the one or more power supplies to provide power to the ITEs in the chassis environment further comprises identifying a number of active power supplies in dependence the power delivery rating and the total power requirement value.

5. The method of claim 1 further comprising powering on one or more additional power supplies in dependence upon a predetermined power mode.

6. An apparatus for budgeting for power consumption in a chassis environment that includes a plurality of integrated technology elements ('ITEs'), each ITE having power utilization information indicating an average power consumption of the ITE, the apparatus comprising a computer processor, a computer memory operatively coupled to the computer processor, the computer memory having disposed within it computer program instructions that, when executed by the computer processor, cause the apparatus to carry out the steps of:

determining, by a chassis management module, a total power requirement value based on a sum of the average power consumption for each ITE;

determining, by the chassis management module, a system power utilization delta in dependence upon system configuration information describing one or more components in the chassis environment including an amount of time required to power on an additional power supply, wherein the system power utilization delta represents an amount of additional power that can be allocated for use by the ITEs;

increasing, by the chassis management module, the total power requirement value in dependence upon the system power utilization delta;

identifying, by the chassis management module, one or more power supplies to provide power to the ITEs in the chassis environment in dependence upon power delivery capabilities of the one or more power supplies and the increased total power requirement value.

7. The apparatus of claim 6 further comprising computer program instructions that, when executed by the computer processor, cause the apparatus to carry out the step of powering off each of the power supplies that were not identified to provide power to the ITEs in the chassis environment.

8. The apparatus of claim 6 further comprising computer program instructions that, when executed by the computer processor, cause the apparatus to carry out the step of rotating, by the chassis management module, which power supplies are identified to provide power to the ITEs in the chassis environment in dependence upon a power supply management policy.

9. The apparatus of claim 6 wherein each of the power supplies has an identical power delivery rating and identifying the one or more power supplies to provide power to the ITEs in the chassis environment further comprises identifying a number of active power supplies in dependence the power delivery rating and the total power requirement value.

10. The apparatus of claim 6 further comprising computer program instructions that, when executed by the computer processor, cause the apparatus to carry out the step of powering on one or more additional power supplies in dependence upon a predetermined power mode.

11. A computer program product for budgeting for power consumption in a chassis environment that includes a plurality of integrated technology elements ('ITEs'), each ITE having power utilization information indicating an average power consumption of the ITE, the computer program product disposed upon a computer readable medium, wherein the computer readable medium is not a signal, the computer program product comprising computer program instructions that, when executed, cause a computer to carry out the steps of:

determining, by a chassis management module, a total power requirement value based on a sum of the average power consumption for each ITE;

determining, by the chassis management module, a system power utilization delta in dependence upon system configuration information describing one or more components in the chassis environment including an amount of time required to power on an additional power supply, wherein the system power utilization delta represents an amount of additional power that can be allocated for use by the ITEs;

increasing, by the chassis management module, the total power requirement value in dependence upon the system power utilization delta;

identifying, by the chassis management module, one or more power supplies to provide power to the ITEs in the chassis environment in dependence upon power delivery capabilities of the one or more power supplies and the increased total power requirement value.

12. The computer program product of claim 11 further comprising computer program instructions that, when executed, cause the computer to carry out the step of powering off each of the power supplies that were not identified to provide power to the ITEs in the chassis environment.

13. The computer program product of claim 11 further comprising computer program instructions that, when executed, cause the computer to carry out the step of rotating, by the chassis management module, which power supplies are identified to provide power to the ITEs in the chassis environment in dependence upon a power supply management policy.

14. The computer program product of claim 11 wherein each of the power supplies has an identical power delivery rating and identifying the one or more power supplies to provide power to the ITEs in the chassis environment further comprises identifying a number of active power supplies in dependence the power delivery rating and the total power requirement value.

15. The computer program product of claim 11 further comprising computer program instructions that, when executed, cause the computer to carry out the step of powering on one or more additional power supplies in dependence upon a predetermined power mode.

\* \* \* \* \*